United States Patent
Lee et al.

(10) Patent No.: US 9,177,146 B1
(45) Date of Patent: Nov. 3, 2015

(54) LAYOUT SCANNER FOR APPLICATION CLASSIFICATION

(75) Inventors: Wen-Chih Lee, Taipei (TW);
Ming-Chang Shih, Taipei (TW);
Wei-Chung Chou, New Taipei (TW)

(73) Assignee: Trend Micro, Inc., Tokyo (JP)

( * ) Notice: Subject to any disclaimer, the term of this patent is extended or adjusted under 35 U.S.C. 154(b) by 399 days.

(21) Appl. No.: 13/270,965

(22) Filed: Oct. 11, 2011

(51) Int. Cl.
*G06F 21/56* (2013.01)
(52) U.S. Cl.
CPC .................................. *G06F 21/566* (2013.01)
(58) Field of Classification Search
CPC ....... G06F 21/52–21/54; G06F 21/56–21/567; G06F 21/577; G06F 3/0481–3/0483; G06F 2221/033
See application file for complete search history.

(56) References Cited

U.S. PATENT DOCUMENTS

| | | | |
|---|---|---|---|
| 8,776,227 B1 * | 7/2014 | Glick et al. .................. 726/23 |
| 2002/0122065 A1 * | 9/2002 | Segal et al. .................. 345/783 |
| 2009/0165136 A1 * | 6/2009 | Obrecht et al. ............... 726/24 |
| 2012/0159620 A1 * | 6/2012 | Seifert et al. .................. 726/22 |
| 2012/0233163 A1 * | 9/2012 | Kirkpatrick .................. 707/737 |
| 2013/0019310 A1 * | 1/2013 | Ben-Itzhak et al. ........... 726/23 |

OTHER PUBLICATIONS

Proc. of the 13th Intl. Conf. on Pattern Recognition, vol. III, pp. 114-119, Vienna, Austria, Aug. 1996; Pictorial Queries by Image Similarity; Aya Soffer et al.; year 1996.*
Building a Malware Zoo; GIAC (GREM) Gold Certification; Author Joel Yonts; Advisor Pedro Bueno; dated Dec. 31, 1999.*
Query by Image and Video Content: The QBIC System; Myron Flickner et al., IEEE, Sep. 1995.*

* cited by examiner

*Primary Examiner* — Ashok Patel
*Assistant Examiner* — Kevin Bechtel
(74) *Attorney, Agent, or Firm* — Beyer Law Group LLP

(57) ABSTRACT

A database of known graphical user interface layouts is generated using samples of known executable files. An executable file having an unknown function is obtained; it is executed within a safe environment and its graphical user interface is identified. Layout analysis enumerates all of the windows within the interface and extracts the position values of each window and the dimension values of each window to form a set of layout information. If the layout database contains this layout information set then it is determined that the layout information is of the same type of software corresponding to the type of software contained within the database (or of the type of software to which the layout information is matched within the database). A match may occur if all the windows match, if only some percentage of the windows match, or if the windows do not match exactly but the dimensions of the corresponding window in the database are within a certain percentage.

10 Claims, 9 Drawing Sheets

LAYOUT SCANNER FOR APPLICATION CLASSIFICATION

FIELD OF THE INVENTION

The present invention relates generally to classification of software applications based upon layout of the user interface. More specifically, the present invention relates to detection of fake anti-virus software programs based upon layout of the user interface.

BACKGROUND OF THE INVENTION

In recent years, with the growth of malicious software and corresponding efforts to combat this malicious software with antivirus software, a new type of malicious software has emerged. This malicious software masquerades as real antivirus software and is often referred to as fake antivirus software, as rogue software or as "scareware."

This fake antivirus software sometimes tricks a computer user into thinking that real antivirus software is present on his or her computer and that hitherto unknown malicious software has been detected by the fake software. The fake software may then deceive the user into purchasing an improved version of the fake software, into paying for the removal of malicious software which does not exist and will not be removed, or into installing other malicious software. Fake antivirus software has become a growing and very serious security issue with desktop computing in general.

The fake antivirus software usually relies upon some type of trick in order to get around installed antivirus software and to install itself onto the user's computer. For example, a malicious Web site may display a fictitious warning that the computer has been infected and encourage the user to purchase or install other fake software. Or, a user may be misled into installing a Trojan through a browser plug-in, through an attachment to an e-mail message, via shared software, via infected URLs in a search result, or via a fictitious online malware scanning service. Some fake antivirus software may not require any user action and instead installs itself via a download that exploits security vulnerabilities in the user's computer software.

The fake software usually has a professional-quality graphical user interface through which they convince users to connect to a bogus Web site in order to purchase or upgrade fake software, pay a fee, install more software, or generally take an action that is not necessary and is usually detrimental to the computer or its user. A hacker can steal a user's credit card or other confidential information via the purchase or transaction.

It can be difficult to detect and remove such fake antivirus software. A traditional file scanner is used to detect malicious software in general, but such a file scanner may not be able to detect fake antivirus software. The fake software uses a customized packer and may use polymorphism. Further, it may also add trash information to its file contents, all to avoid detection by a traditional signature-based file scanner. A behavior monitor of antivirus software also may have difficulty in detecting fake antivirus software. Because the behavior of fake antivirus software can be very similar to that of a normal software application the behavior monitor may not be able to detect the fake software. For example, the fake software may simply present a pleasant-looking graphical user interface that convinces the user to connect to a malicious Web site in order to purchase the fake software.

Furthermore, the fake software may change its contents, file name, installed path, installed registries, resource icon, or connected Web site URL, all in order to prevent detection by traditional file scanning or behavior monitoring. Due to these tricks and the potential similarity between fake antivirus software and a normal application, it can be very difficult to identify the fake software.

For these reasons, it is believed that current scanning and monitoring techniques can be improved in order to detect and classify software applications, and to remove fake antivirus software in particular. Accordingly, new techniques are desired.

SUMMARY OF THE INVENTION

To achieve the foregoing, and in accordance with the purpose of the present invention, a layout scanner is disclosed that is able to classify software based upon its graphical user interface.

The technique uses a window-based approach in order to enumerate all windows in a user interface and create a layout signature. Such a layout is typically a good signature for a software application because the software application, especially fake antivirus software, will rarely make changes to its user interface layout even though changes may be made to file names, contents, installed registries, install paths, interface icons, and links to URLs. An entire product family of software applications (or of fake antivirus software) will often share the same look and feel.

In one embodiment, the technique generates a database of known layouts by using samples of executable files each having a known function, i.e., the type of software is known beforehand. The type may be antivirus software or fake antivirus software. The executable file is executed within a safe environment and its graphical user interface is identified. A layout analysis step enumerates all of the windows within this user interface and extracts the position of each window and the dimensions of each window in order to extract a list of position and dimension values for each window. The set of all of these values for each window within the user interface forms the layout information for this executable file. If a layout database does not already contain this layout information then this layout information (also termed a pattern) is added to the layout database. A layout database may include only layout information corresponding to software files of a particular type, or, different types may be represented within the database and in this case each set of layout information is also associated with a label identifying the type.

In a second embodiment, the technique acquires a sample of an executable file having an unknown function (i.e., its type is unknown). The sample may optionally be checked against a white list first for efficiency reasons. The executable file is executed within a safe environment and its graphical user interface is identified. A layout analysis step enumerates all of the windows within this user interface and extracts the position of each window and the dimensions of each window in order to extract a list of position and dimension values for each window. The set of all of these values for each window within the user interface forms the layout information for this executable file. If the layout database contains this layout information then it is determined that the layout information is of the same type of software corresponding to the type of software contained within the database (or of the type of software to which the layout information is matched within the database). A match may occur if all the windows match, if only some percentage of the windows match, or if the windows do not match exactly but the dimensions of the corresponding window in the database are within a certain percentage.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Since 2008, more and more malware is using social networks in order to disguise fake software as a normal application or as an antivirus application. Once a trusting user downloads and installs the fake software (often from a link listed on a trusted friend's Web log, Web page, or social network page) they see a professional looking antivirus application with all of the expected functions. Furthermore, the fake application often appears to scan faster, use less system resources and perform better since the fake application is not actually working to protect the user's computer. Typically, the fake application then proceeds to notify the user that their computer is infected and asks the user to pay a fee, link to a bogus Web site, purchase more software or an upgrade, etc. When the user then performs a transaction the fake software (or the bogus Web site) will steal the user's credit card or other confidential information via the transaction.

Fortunately, it has been realized that the layout of the graphical user interface of particular software applications (especially those that originate from the same product family) is very similar. The interface layout of fake antivirus software has been realized to be quite similar especially in the case of fake software from the same product family.

Layout Examples

The following figures illustrate three different graphical user interfaces for supposedly different software products, but these software products are actually polymorphs of the original fake antivirus software. Each of these software products has a different file name, different contents, a different installed path, a different installed registry and process behavior, even a different resource icon, and are thus difficult to detect using traditional file scanning or behavior monitoring.

Figure 1:
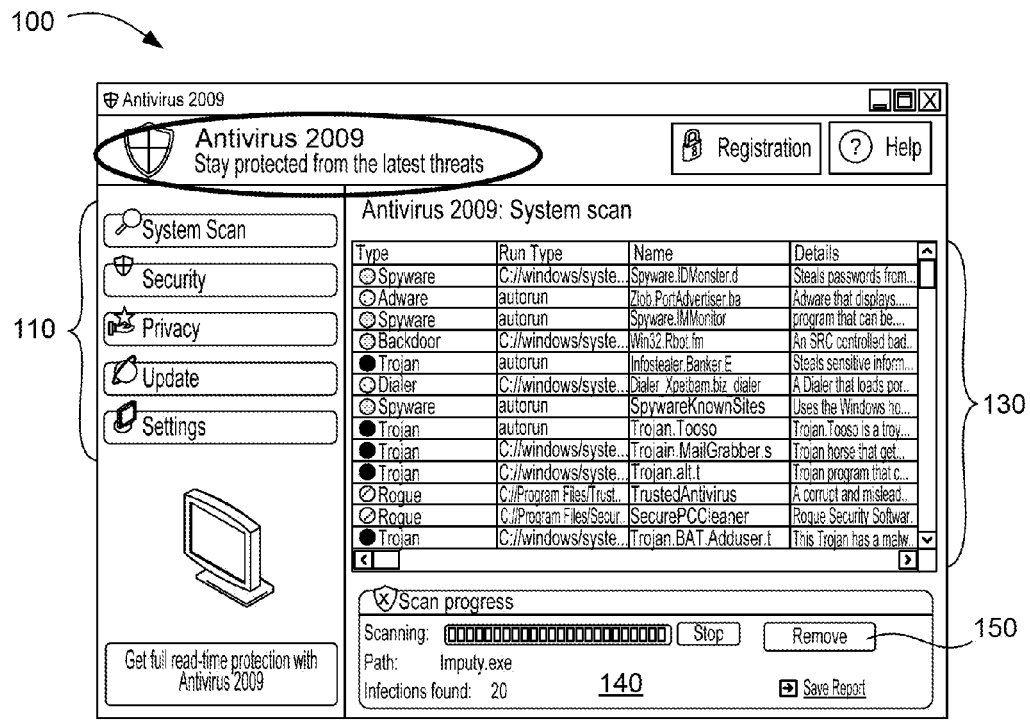
FIG. 1 illustrates a graphical user interface for a fake antivirus software product called "Antivirus 2009."

FIG. 1 illustrates a graphical user interface 100 for a fake antivirus software product called "Antivirus 2009."

Figure 2:
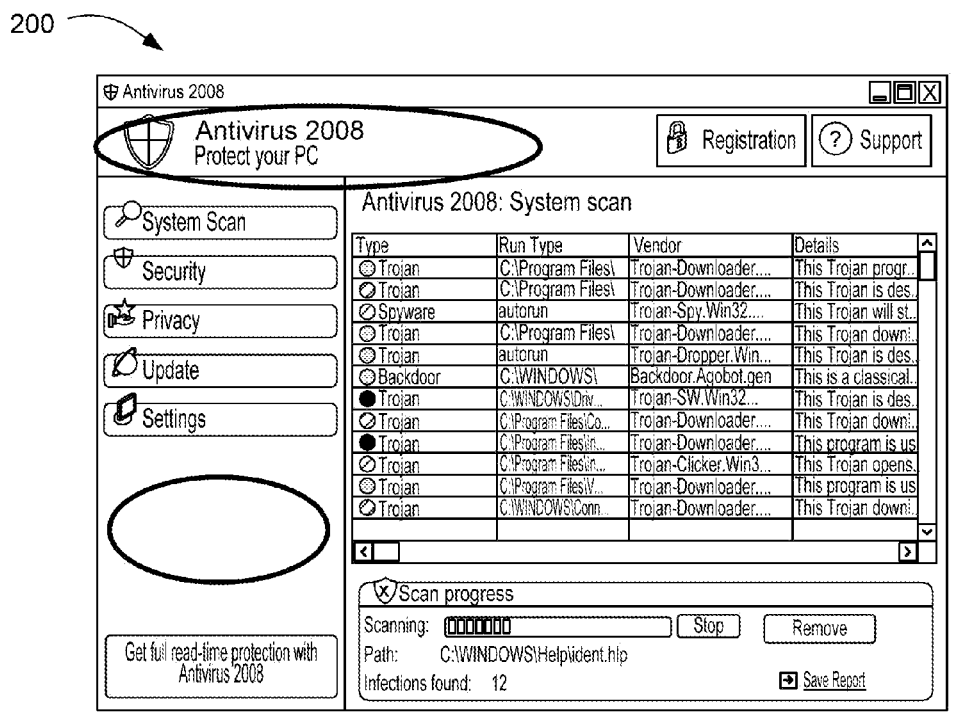
FIG. 2 illustrates a graphical user interface for a fake antivirus software product called "Antivirus 2008."

FIG. 2 illustrates a graphical user interface 200 for a fake antivirus software product called "Antivirus 2008."

Figure 3:
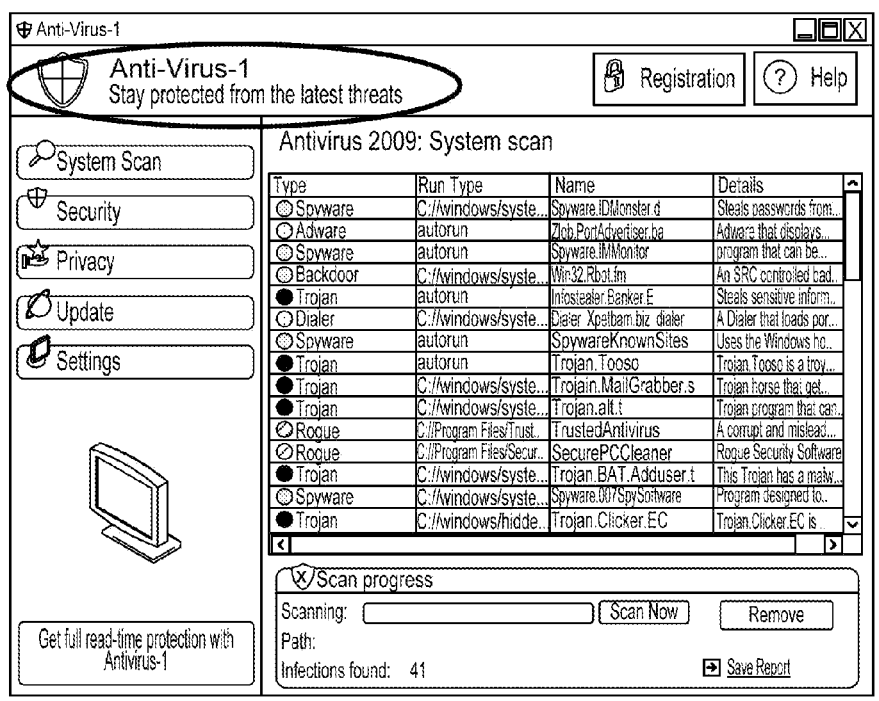
FIG. 3 illustrates a graphical user interface for a fake antivirus software product called "Anti-virus 1."

FIG. 3 illustrates a graphical user interface 300 for a fake antivirus software product called "Anti-virus 1."

Even though these three software products have different names, different icons that have been installed differently, their graphical user interface layouts are nearly the same. A novel layout scanner may be used to detect the general layout of each user interface using appropriate operating system functions. The layout of a particular software application may then be compared to other known layouts (or to each other) in order to classify the software application, or in the case of fake antivirus software, detect it, warn the user, and remove it.

Figure 4:
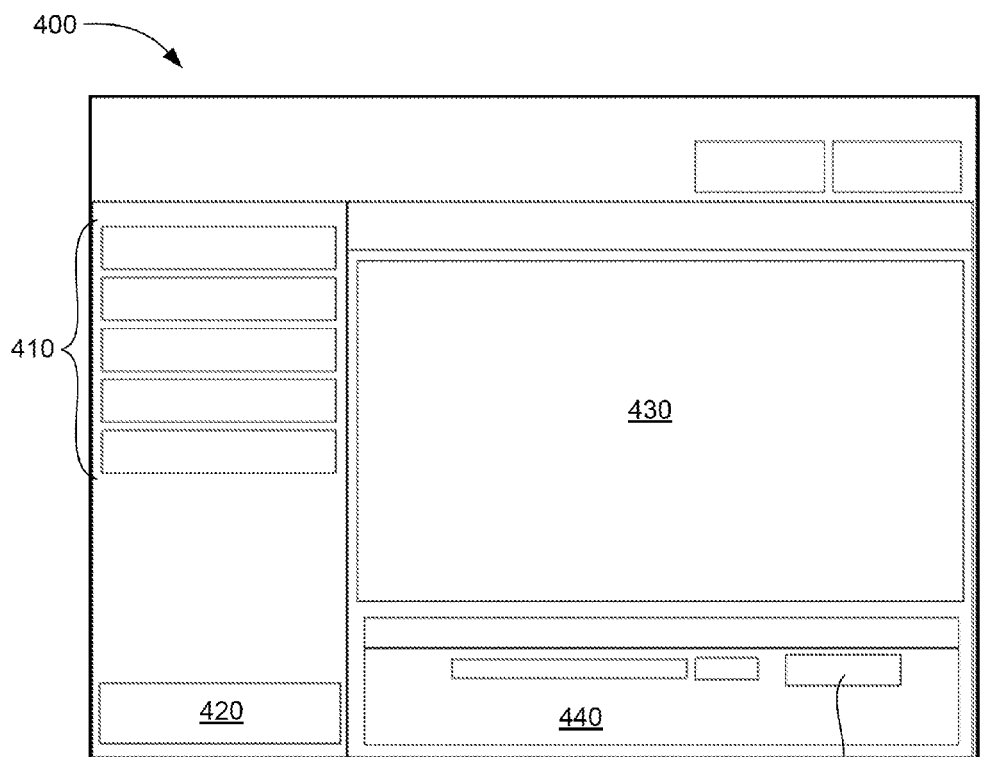
FIG. 4 illustrates the general layout of the graphical user interface of FIG. 1.

FIG. 4 illustrates the general layout 400 of the graphical user interface of FIG. 1. The outlines of windows in FIG. 4 correspond to the user interface windows of FIG. 1. For example, regions 410-440 correspond respectively to regions 110-140 of FIG. 1. In particular, region 450 corresponds to the "Remove" button 150. Other regions in FIG. 4 correspond to respective locations in FIG. 1. A general layout may also be derived for each of FIGS. 2 and 3, and each of these layouts will be very similar to that of FIG. 4. Similar layouts may be assumed to be of the same general type and may be classified accordingly.

Figure 5:
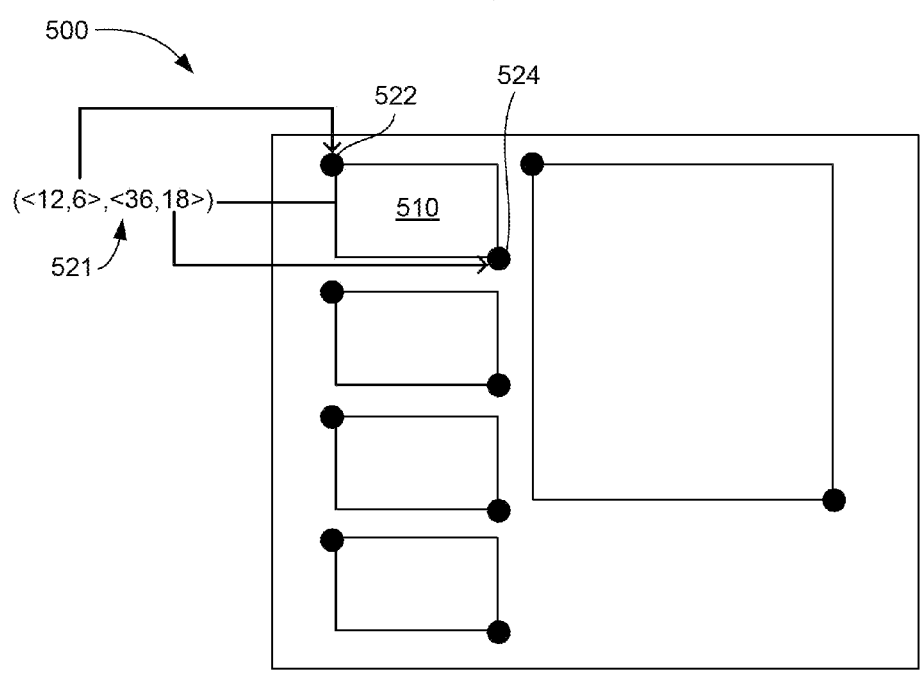
FIG. 5 illustrates a general layout of an example graphical user interface.

FIG. 5 illustrates a general layout 500 of an example graphical user interface. This example illustrates what technique for comparing layouts with one another. Once the regions of the user interface have been identified, each region (or window) is identified by a numerical vector. For example, region 510 is indicated by the vector 521, namely, (12, 6, 36, 18). The first two numerals of the vector indicate a starting point for the region (i.e., its initial horizontal position and its initial vertical position) at reference point 522, while the second two numerals of the vector indicate its width (18) and its height (18), shown by reference point 524. Once a vector is obtained for each region of the layout, these vectors may be compared against corresponding vectors for a different layout in order to determine if the two layouts are similar. For example, if 80% of a first layout matches substantially the vectors of a second layout, it may be determined that the first layout represents the same type of software represented by the second layout. Of course, other percentages or thresholds may also be used.

By using this technique and iterating over known software applications and their respective layouts and vectors for each region, a layout database may be generated for future reference. Such a layout database may then be used to compare to an unknown software application and its general layout in order to classify the software application and/or to detect fake antivirus software.

Further Layout Examples

Figure 6:
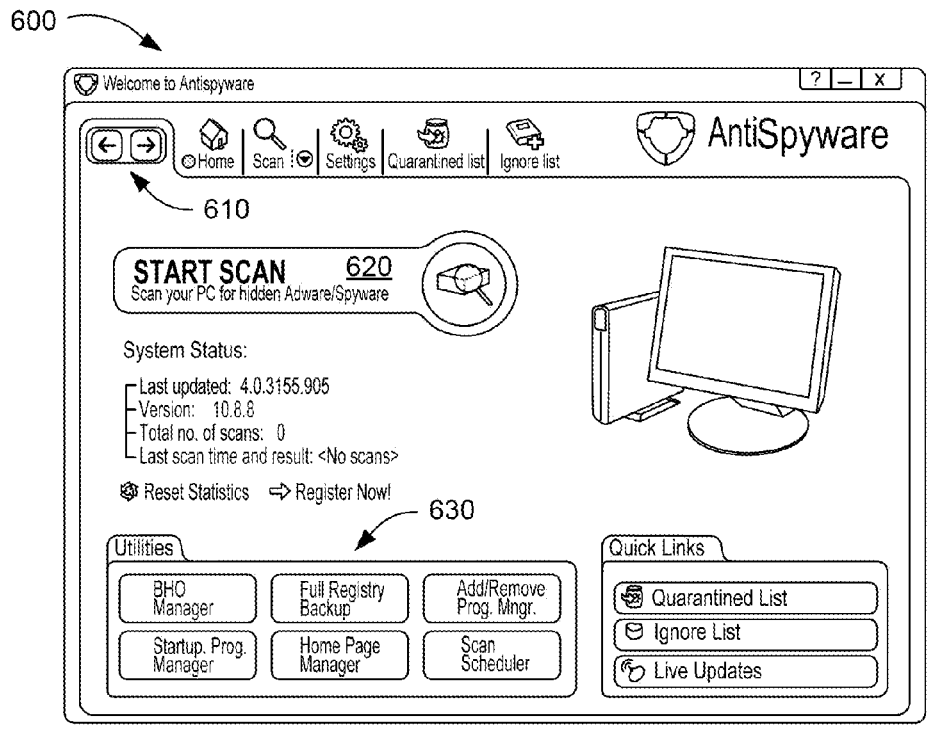
FIG. 6 illustrates a graphical user interface for a fake antivirus software product called "AntiSpyware."

FIG. 6 illustrates a graphical user interface 600 for a fake antivirus software product called "AntiSpyware."

Figure 7:
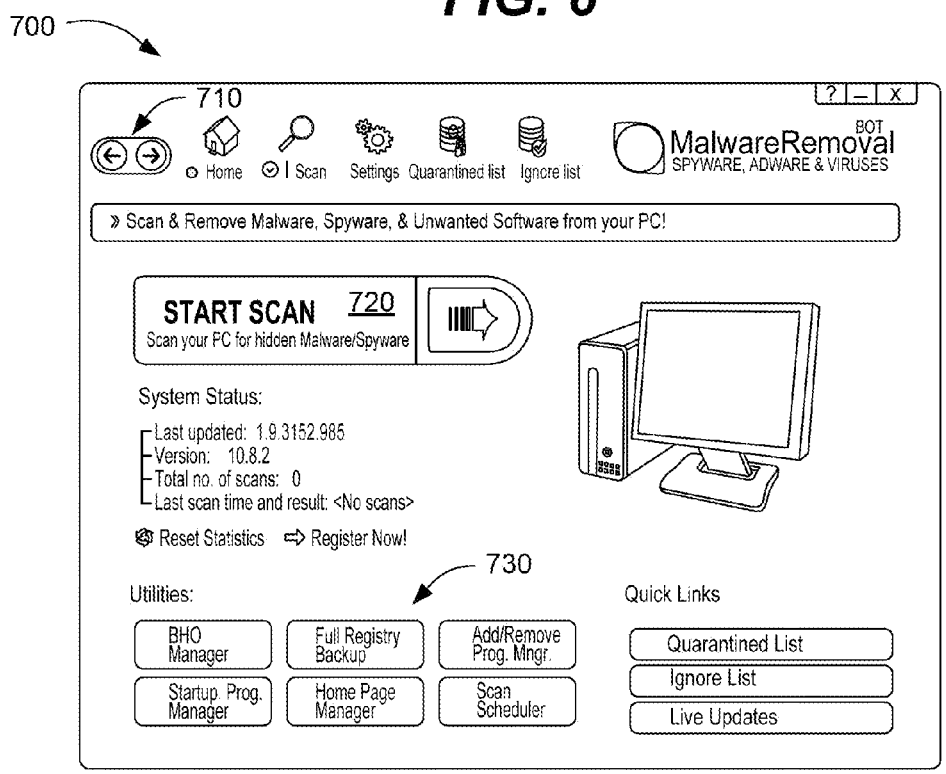
FIG. 7 illustrates a graphical user interface for a fake antivirus software product called "MalwareRemoval."

FIG. 7 illustrates a graphical user interface 700 for a fake antivirus software product called "MalwareRemoval."

A casual glance at both of these user interfaces reveals that the layouts of both user interfaces appears to be the same.

Thus, even though the file names are different, the product names are different, the contents are slightly different, and some of the graphical images are different, it is apparent that the general layout of both of these user interfaces is more or less the same.

Figure 8:
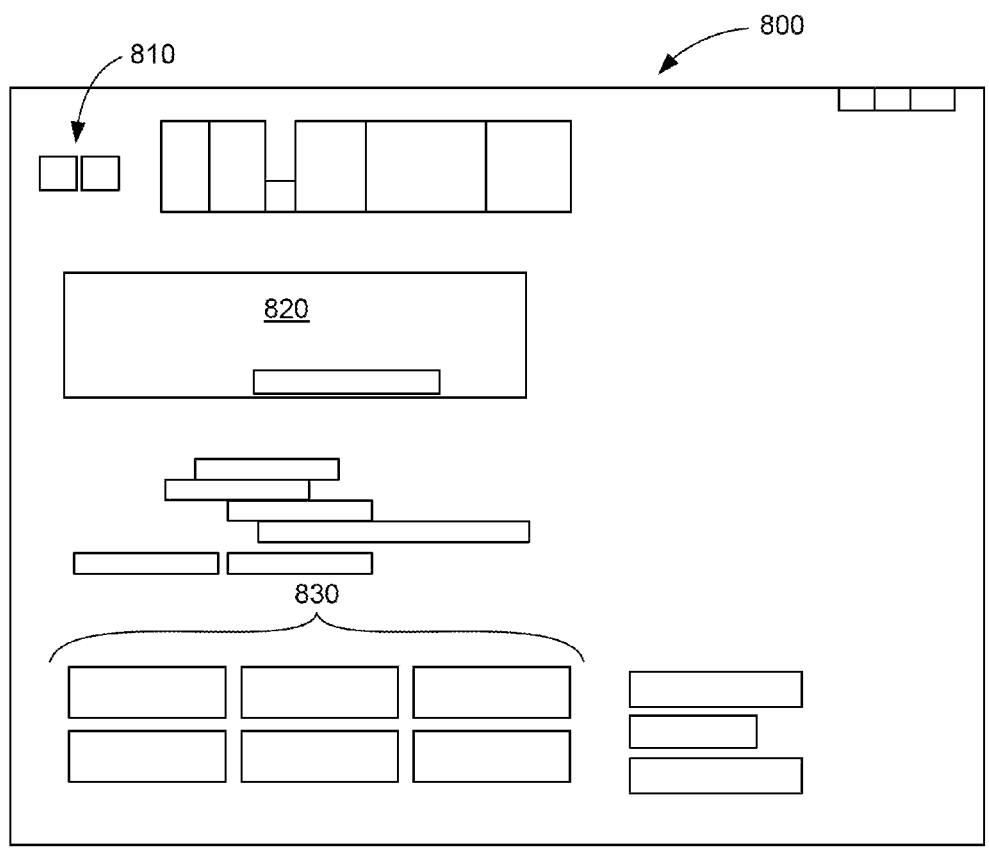
FIG. 8 illustrates the general layout of a graphical user interface that represents the layouts of both of the user interfaces of FIGS. 6 and 7.

FIG. 8 illustrates the general layout 800 of a graphical user interface that represents the layouts of both of the user interfaces of FIGS. 6 and 7. As shown, FIG. 6 has regions 610-630 that correspond to regions 710-730 in FIG. 7, and regions 810-830 of FIG. 8 represents the general layout of those regions of FIGS. 6 and 7. Thus, even though the product names are different, the computer images are different, and some of the numerical values are different, an analysis of both of the layouts of FIGS. 6 and 7 reveals that they represent the same type of software application, namely in this example, fake antivirus software.

Flowchart Example—Generate Layout Information

Figure 9:
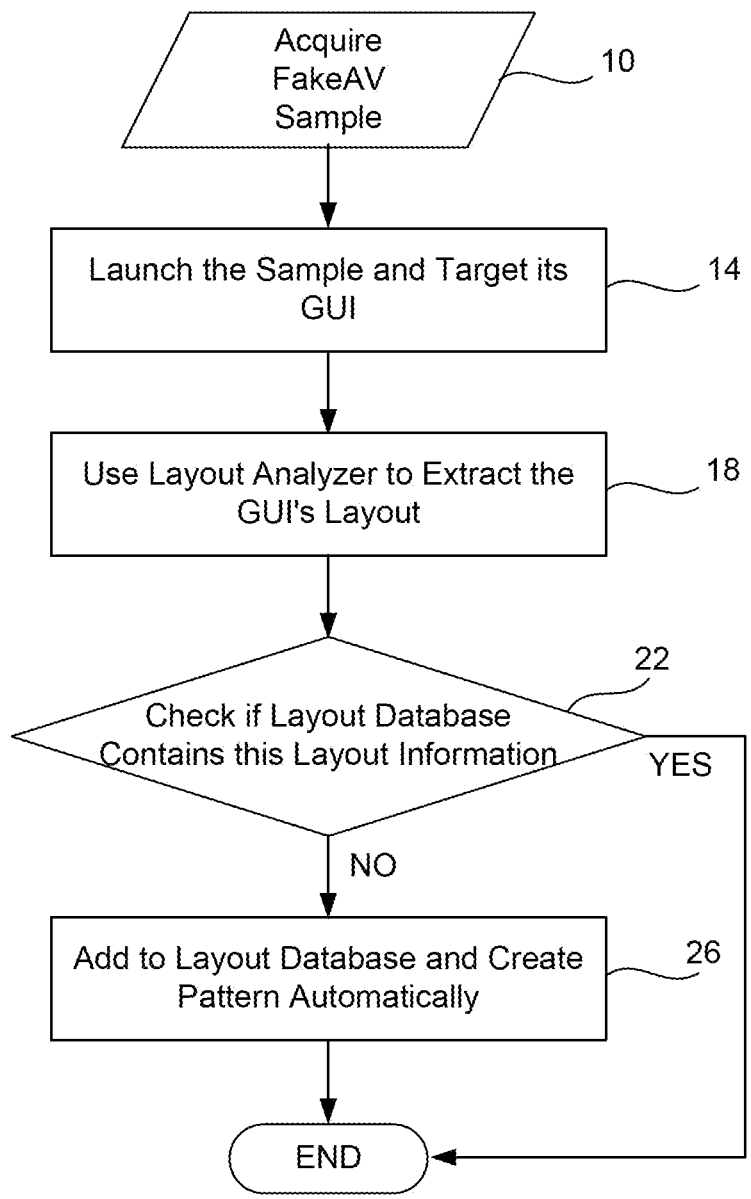
FIG. 9 is a flowchart describing one embodiment by which a database of software layouts and their types are generated.

FIG. 9 is a flowchart describing one embodiment by which a database of software layouts and their types are generated. In order to analyze the layout of a user interface of a particular software application in order to classify it as belonging to a particular type, it can be useful to reference a database of known layouts, that is, a database of layouts where each layout is known to represent a particular type of software, such as fake antivirus software. Of course, the database may represent other classifications of software other than fake antivirus software, and the database may also represent numerous types of software, where each layout is tagged with its particular classification.

In step 10 a particular known software sample is obtained; the sample has previously been identified as being of a particular type such as fake antivirus software, real antivirus software, fake bank software, fake commercial software (e.g., that asks you to input your account and password), etc. Typically, the sample is obtained through use of legitimate antivirus software in the normal course of detecting malware and is most often an executable file.

In one specific embodiment of the invention, every time a sample of fake antivirus software is obtained it is processed via the steps of this flowchart in order to keep its representation in the layout database. In step 14 the software sample is executed and its graphical user interface is targeted for analysis. Preferably, the sample is executed within a sandbox or other safe environment so that the sample will not adversely affect its computing environment. A sandbox is a known security mechanism for isolating an executing program from the computer hardware and actual operating system in which it executes. It is often used to execute untested code, or untrusted programs from unverified third-parties, suppliers and untrusted users. This safe environment is also called a virtualization operating system in that the sample is executing within the virtualization operating system which itself is executing within the actual operating system of the computer. As such, the behavior of the executing sample may be monitored and it is not possible for the sample to have any adverse effects upon the actual operating system.

The graphical user interface is next targeted once the sample begins executing within the sandbox. It is desirable to target the user interface so that its layout may be analyzed, summarized and stored within the layout database. First, we monitor the sandbox and obtain the new process identifier (for example, "1024") for the sample which has been created in the sandbox. Next, we use the operating system function "WIN32API EnumWindows" to enumerate all of the graphical user interface programs and use the function "WIN32 API GetWindowThreadProcessId" to get its process identifier. Then, we compare the newly created process identifier with the enumeration of all of the graphical user interface program process identifiers. If we find a process identifier that matches with the newly created process identifier, then that process's window will be the one that we should target. Once targeted, the graphical user interface may now be analyzed.

Preferably, the sample file continues executing within the virtualization environment while the user interface is analyzed. Once we have completed the analysis of the graphical user interface, we terminate the target process and roll back the virtualization environment to a clean status for use with the next sample.

In step 18 the graphical user interface is analyzed as previously described in FIGS. 4 and 5 in order to extract vectors corresponding to the layout of each region or window within the user interface. Of course, any of a variety of techniques may be used to identify each window within the user interface and to determine its location and size. In one particular embodiment under the Microsoft operating system the API functions "EnumWindows" and "EnumChildWindow" may be used to enumerate all windows of a particular interface of an application and to obtain the position and size of each window. This position and size information may then be stored as a vector as described above.

In one specific embodiment, the following steps may be used to extract the layout of a specific graphical user interface. First, we denote the target window identified above as the "Parent window." Next, we use this Parent window as input to call the function "WIN32 API EnumChildWindow" in order to enumerate all of the specific child windows of the graphical user interface. We then use the functions "WIN32 API Thread32First" and "Thread32Next" in order to enumerate the thread that belongs to the specific GUI's program. Finally, we use the Thread ID as input to call the function "WIN32 API EnumThreadWindow" in order to enumerate all of the specific thread windows of the graphical interface. The output of "EnumChildWindow" and "EnumThreadWindow" will be the set of vectors that may be used to construct the layout of the specific graphical user interface window. This set of vectors is also termed the "pattern" for this user interface.

Figure 10:
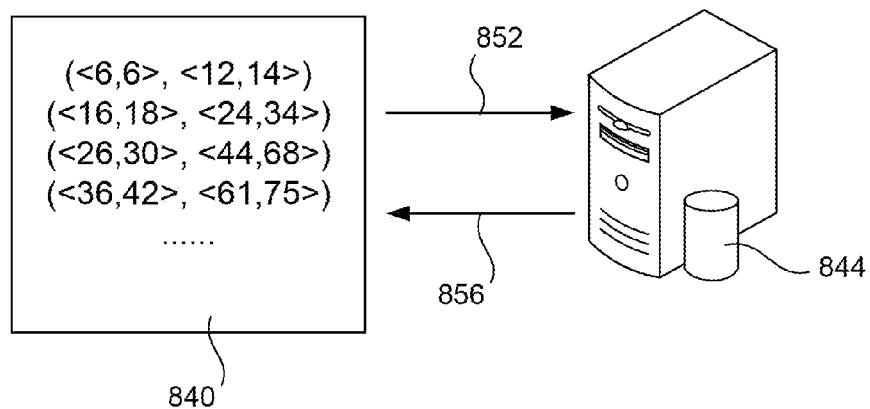
FIG. 10 shows an example of layout information (in the form of vectors) that are being passed to a layout database within a computer.

Of course, the set of vectors need not be arranged as specifically shown in FIG. 10. The values describing the initial starting point of a window and its dimensions may be ordered in any fashion, may use real numbers instead of integers, may use a different coordinate system for specifying a window's location, etc. The size and location of a window may also be identified in different ways. Because a window is a rectangle, its size and location is typically identified by a set of vectors, thus the Microsoft OS API "EnumChildWindow" returns two points to determine the dimensions of the window. For example, the set {<4,8>, <12,2>} identifies a window with a top left corner at the coordinate <4,8> and with a lower right corner at <12,2>.

Once the vectors for windows of the user interface are obtained, in step 22 a layout database is checked in step 22 to ascertain whether this layout information is already present. FIG. 10 shows an example of layout information 840 (in the form of vectors) that are being passed 852 to a layout database 844 within a computer. Once the layout information is received this information is compared against each set of layout information within the database (each set representing a graphical user interface of a software application) in order to determine whether the incoming layout information is already represented within the database. This comparison is performed by determining whether the set of vectors for the incoming layout information matches any set of vectors within the database. Even if some vectors representing a particular window or windows within the layout information do not match exactly with windows of a layout within the database, a determination may still be made that the layout is already present. For example, if at least a certain percentage of the windows of the sample are present within the database a conclusion may still be reached that the layout is already present.

In an alternative embodiment, windows of a sample layout need not exactly match the windows of an existing layout in the database in order to make the determination that the layout is already present. The position and dimensions of windows of a layout may vary by as much as 10% (for example) and the conclusion may still be reached that the layout is present. For example, while each window of the sample may have a corresponding window in a particular layout in the layout database, even if the vectors for each window of the sample do not match exactly with the vectors found in the layout database, a conclusion may be reached that the layout is still present as long as the vectors do not vary by more than a certain percentage. In one particular example, a window having a vector (10, 20, 4, 5) will still match a window in the layout database having a vector of (11, 19, 3, 6).

Each layout represented within the layout database is also associated with, tagged with, identified by, or otherwise labeled with a label representing the type of software application from which it has originated, such as "Fake Antivirus Software," "Real Antivirus Software," "Banker" or "Network Connecter". Alternatively, if the entire layout database only represents software of a particular type (for example, fake antivirus software) then there is no need for each layout in the database to be labeled. If it is determined in step 22 that the layout database already contains this layout information than no action is taken in the flowchart ends.

A communication 856 from the database back to the origin of the layout information indicates whether or not the layout information is already present within the database.

On the other hand, if it is determined that the layout database does not yet contain this layout information along with a label identifying the type of software, then in step 26 this layout information is added to the database along with a label identifying the type of software from which it has originated. This layout information (the set of vectors) is also termed the "pattern" for the particular sample from which it was obtained.

Figure 11:
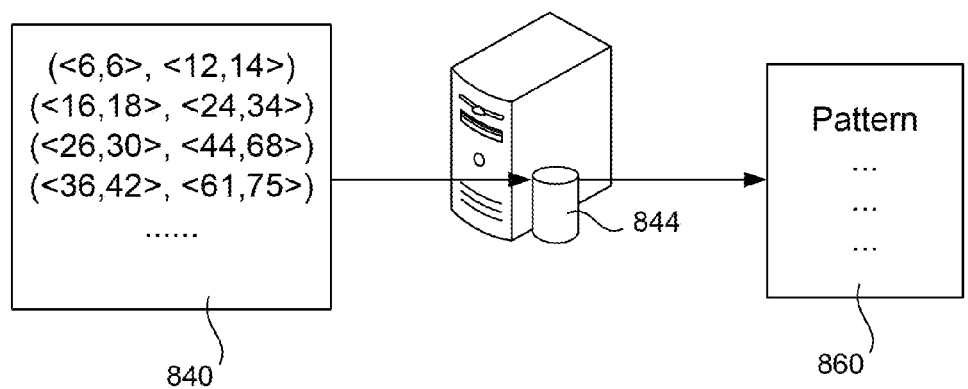
FIG. 11 shows layout information being stored within database as a pattern.

FIG. 11 shows layout information 840 being stored within database 844 as a pattern 860.

Once the layout information has been stored and the pattern has been created the flowchart ends.

Flowchart Example—Classify Software

Figure 12:
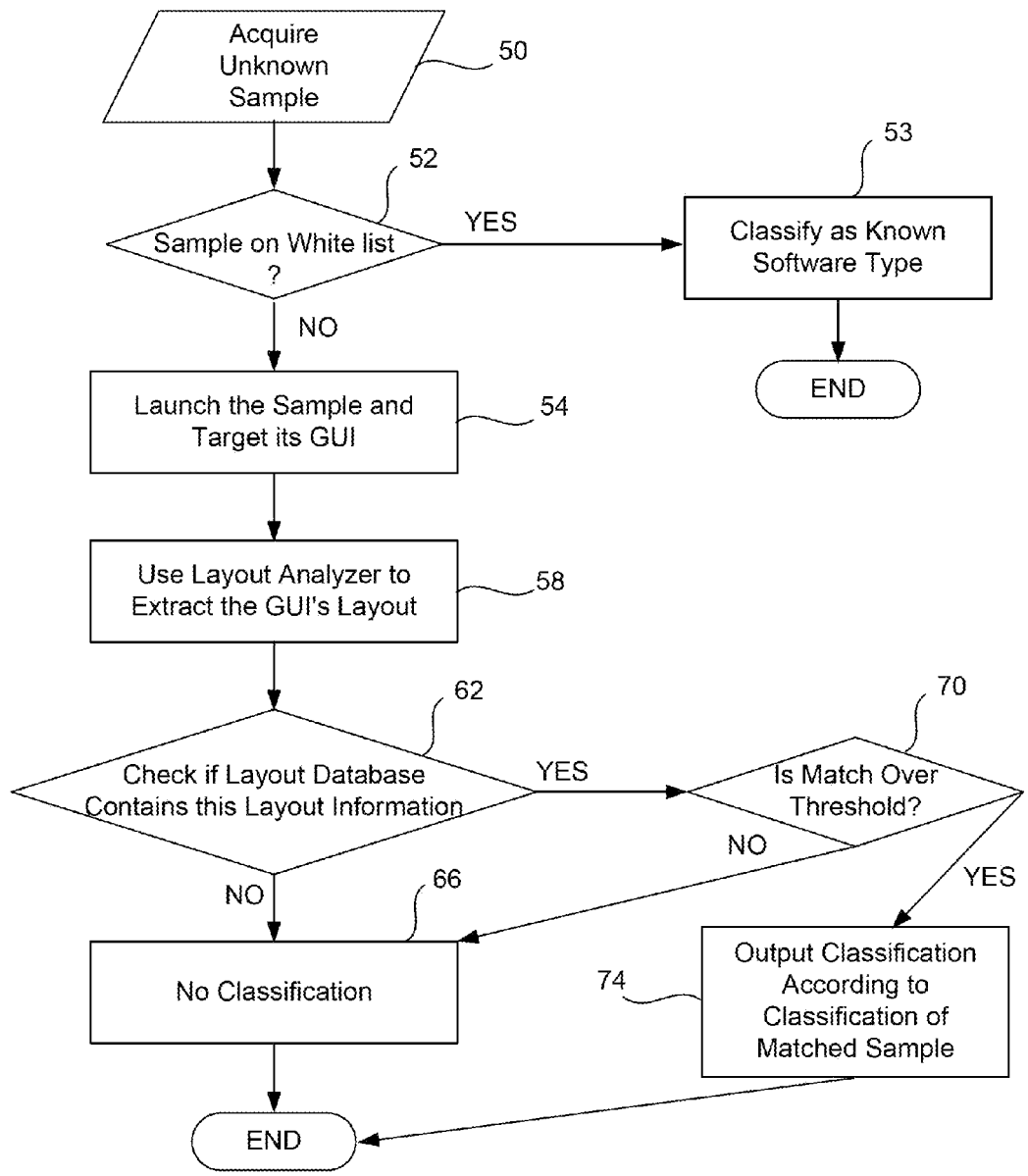
FIG. 12 is a flowchart describing one embodiment by which an unknown software application is analyzed in order to classify it.

FIG. 12 is a flowchart describing one embodiment by which an unknown software application is analyzed in order to classify it. In order to classify a software application (using the layout of its graphical user interface) as belonging to a particular type, it can be useful to reference a database of known layouts, that is, a database of layouts where each layout is known to represent a particular type of software, such as fake antivirus software, and where each layout is labeled according to its software type. The creation of such a layout database has been described above and the below flowchart makes use of such an existing database.

In step 50 an unknown software sample is obtained; the sample has not yet been classified as being of a particular type. In step 52 the unknown sample is checked against a white list of known legitimate samples. For example, the digital signature of the unknown sample may be checked to determine if the digital signature was created (or signed) by a known legitimate entity. If so, it is known that the sample is actually legitimate software (i.e., it is not fake antivirus software) and it may be classified as legitimate software (for example). Alternatively, a message digest may be calculated for the unknown sample and compared against a white list of known message digests, or other techniques of comparing an executable file to a white list may also be used.

In step 54 the unknown software sample is executed and its graphical user interface is targeted for analysis. Preferably, the sample is executed within a "sandbox" or other safe environment so that the sample will not adversely affect its computing environment. The user interface is targeted using the procedure described above with respect to step 14.

In step 58 the graphical user interface is analyzed as previously described in step 18 in order to extract vectors corresponding to the layout of each region or window within the user interface. Of course, any of a variety of techniques may be used to identify each window within the user interface and to determine its location and size. The result is a set of vectors describing the layout of the windows of the graphical user interface.

Once the vectors for windows of the user interface are obtained, in step 62 the layout database is checked to ascertain whether this layout information is already present. Once the layout information is received in the database this information is compared against each set of layout information within the database (each set representing a graphical user interface of a software application) in order to determine whether the incoming layout information is already represented within the database. This comparison process has already been described above.

In step 70 it is determined whether a match exists if a certain percentage of the layout of the unknown sample matches with one of the layouts in the layout database. For example, a threshold of 80% may be used indicating that if 80% of the windows of the unknown layout match with windows of one of the layouts in the database then the conclusion may be reached that a match does exist and that the unknown sample may be classified as the same type as the layout of the database. In one embodiment, a window of the unknown sample matches with one of the windows in a layout within the layout database if the vectors for the two windows are the same. It is realized that typically with fake antivirus software, while the names, content and icons may change often, the position and size of the windows of the graphical user interface remain exactly the same. Therefore, matches can be determined by requiring that most or all of the windows match exactly. In another embodiment, a window may match another window in the layout database even if the position and dimensions of the two windows are not exact, but vary within a certain percentage.

If, in step 62 the unknown layout is clearly not present, or, if in step 70 a portion of the unknown layout matches but the match percentage is not greater than the threshold, then in step 66 a determination is made that no classification can be determined for the unknown layout and the flowchart ends. On the other hand, if the match percentage is greater than the threshold, then in step 74 a determination is reached that the unknown sample may be classified as the same type as the matched layout in the database. For example, if the layout of the unknown sample matches a layout in the database which has a type of "Fake Antivirus Software," then the unknown sample will also be classified as being "Fake Antivirus Software." Output may be to a display screen, to a database, as input to another computer program, to a hard printout, or in other ways known in the art.

Once a determination has been made that no classification can be reached or a classification is output then the flowchart ends.

Computer System Embodiment

Figure 13A:
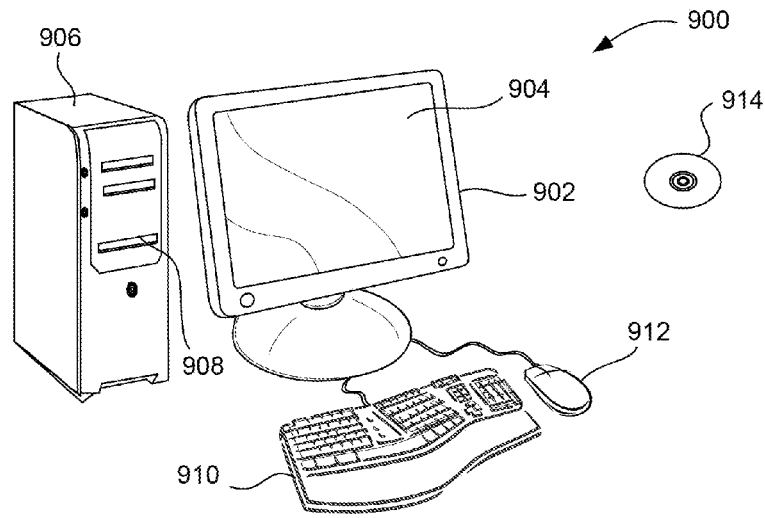
FIGS. 13A and 13B illustrate a computer system suitable for implementing embodiments of the present invention.
Figure 13B:
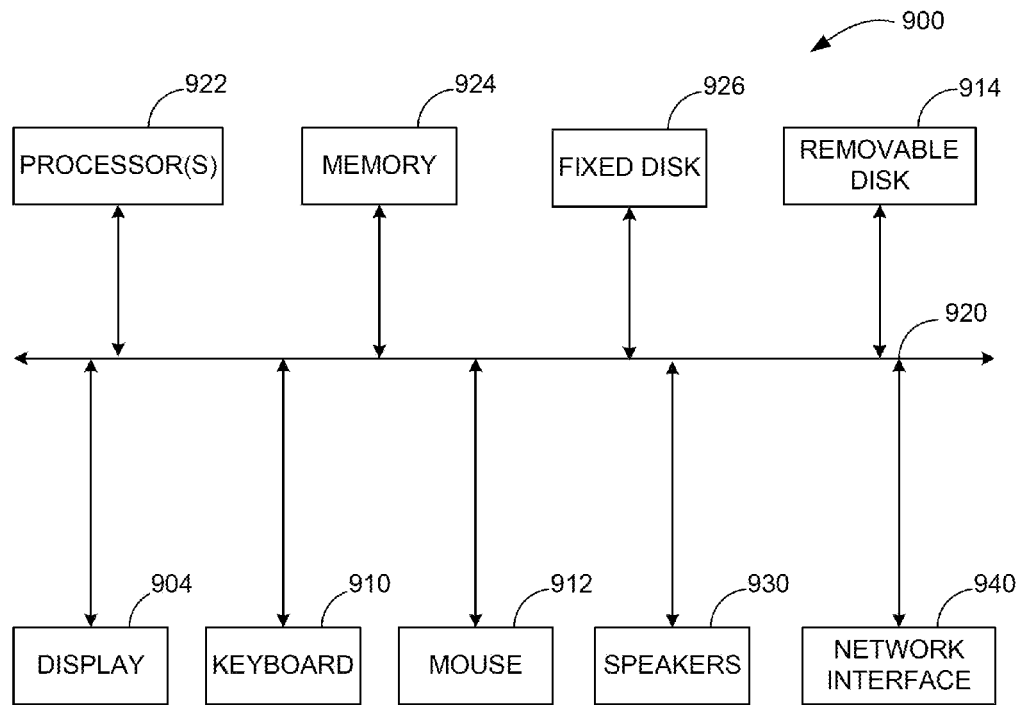

FIGS. 13A and 13B illustrate a computer system 900 suitable for implementing embodiments of the present invention. FIG. 13A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 13B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of classifying software by a computing device, said method comprising:
    receiving an executable file within the computing device, wherein it is unknown whether said executable file is malware;
    executing, by the computing device, said executable file within a virtualization environment of said computing device and creating a process identifier for said executing file;
    identifying, by the computing device, a graphical user interface program of said executable file during said execution by comparing said process identifier of said executing executable file with process identifiers of graphical user interface programs that are executing within said virtualization environment, said graphical user interface program including a plurality of windows;
    obtaining, by the computing device, position and dimension values for each of said windows from said graphical user interface program via a function;
    querying, by the computing device, a database with said position and dimension values of said executable file to determine whether said position and dimension values are present within said database, wherein said database comprises sets of position and dimension values, each of said sets including a label indicating a type of an executable file corresponding to said each of said sets;
    determining, by the computing device, whether a certain number of said position and dimension values of each of said windows match a set of position and dimension values within said database, wherein a match occurs if the position and dimension values of a window of each of said windows do not vary by more than a certain percentage from the set of position and dimension values within said database; and
    returning, by the computing device, a result regarding a classification of said executable file based upon said querying of said database, said result indicating whether said classification of said executable file is malware.

2. The method as recited in claim 1 further comprising:
    determining that said position and dimension values are not present within said database when said certain number is not greater than a threshold value; and
    returning said result indicating that said classification of said executable file is unknown.

3. The method as recited in claim 1 further comprising:
    determining that said position and dimension values are present within said database when said certain number is greater than a threshold value, said sets of position and dimension values being associated with a known type of malware; and returning said result indicating that said classification of said executable file is said known type of malware.

4. The method as recited in claim 1 wherein said database includes other position and dimension values associated with fake antivirus software.

5. The method as recited in claim 1 wherein said position and dimension values for each of said windows identifies a region within said graphical user interface.

6. The method as recited in claim 1 wherein said position and dimension values for each of said windows is represented as a numerical vector.

7. The method of claim 1 wherein the dimension values for at least one of said windows is not visible in a display of said graphical user interface program on said computing device.

8. A method as recited in claim 1 further comprising:

checking said executable file against a white list in order to determine whether said executable file is legitimate software or not.

9. A non-transitory computer-readable storage device with instructions stored thereon for implementing a method of classifying software that, when executed by one or more computer processors, cause the one or more computer processors to perform operations comprising:

receiving an executable file within a computer, wherein it is unknown whether said executable file is malware;

executing said executable file within a virtualization environment of said computer and creating a process identifier for said executing file;

identifying a graphical user interface program of said executable file during said execution by comparing said process identifier of said executing executable file with process identifiers of graphical user interface programs that are executing within said virtualization environment, said graphical user interface program including a plurality of windows;

obtaining position and dimension values for each of said windows from said graphical user interface program via a function;

querying a database with said position and dimension values of said executable file to determine whether said position and dimension values are present within said database, wherein said database comprises sets of position and dimension values, each of said sets including a label indicating a type of an executable file corresponding to said each of said sets;

determining whether a certain number of said position and dimension values of each of said windows match a set of position and dimension values within said database, wherein a match occurs if the position and dimension values of a window of each of said windows do not vary by more than a certain percentage from the set of position and dimension values within said database; and returning, by the computing device, a result regarding a classification of said executable file based upon said querying of said database, said result indicating whether said classification of said executable file is malware.

10. A non-transitory computer-readable storage device recited in claim 9 further comprising instructions for:

checking said executable file against a white list in order to determine whether said executable file is legitimate software or not.

* * * * *